March 16, 1937.  F. C. BRODERICK  2,073,676
CONTROL DEVICE AND CIRCUITS FOR HOT WATER HEATING SYSTEMS
Filed March 16, 1935
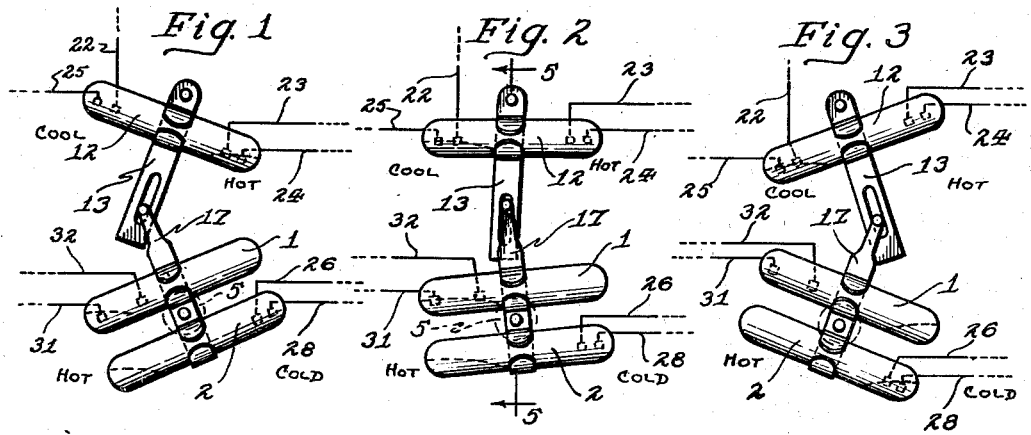
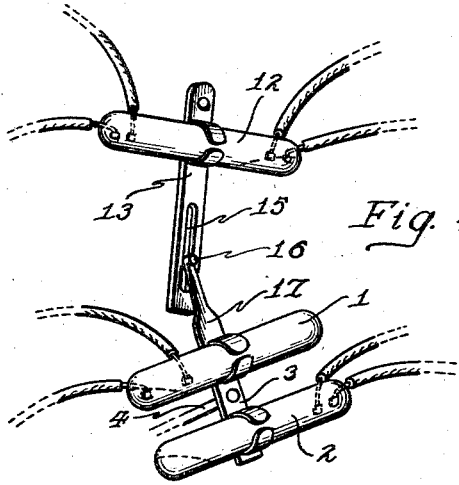
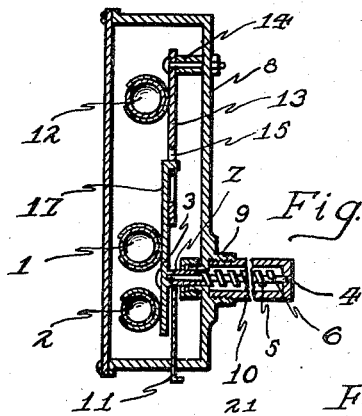
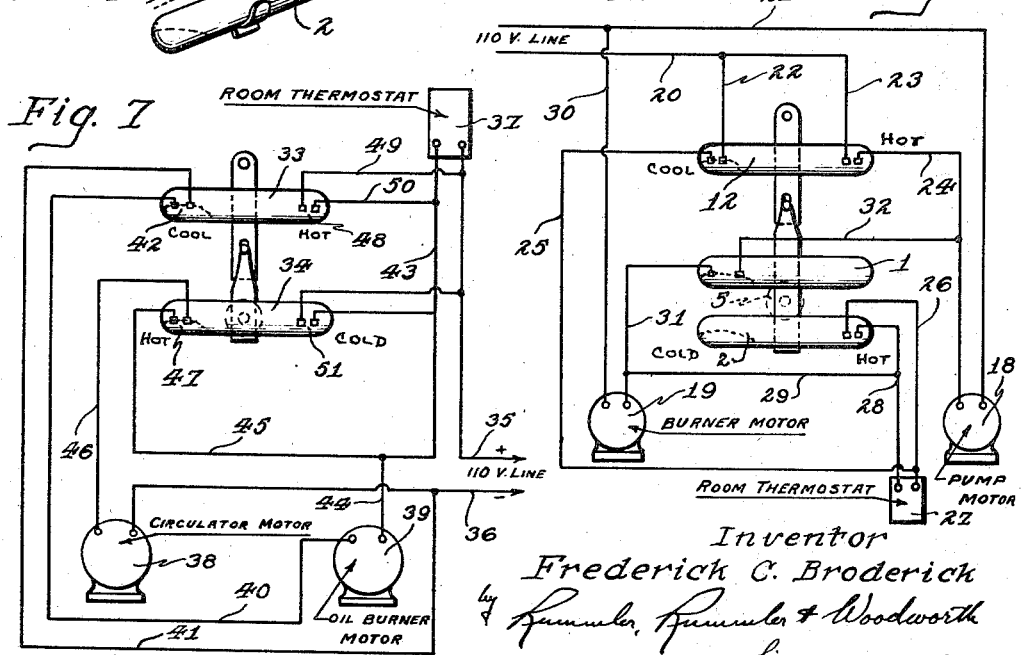
Inventor
Frederick C. Broderick
by Rummler, Rummler & Woodworth
his Attys.

Patented Mar. 16, 1937

2,073,676

UNITED STATES PATENT OFFICE 2,073,676

CONTROL DEVICE AND CIRCUITS FOR HOT WATER HEATING SYSTEMS

Frederick C. Broderick, Winnetka, Ill.

Application March 16, 1935, Serial No. 11,435

4 Claims. (Cl. 236—9)

This invention relates to thermostatically actuated control devices for hot water heating systems, and particularly to a unitary device providing high and low limit control for automatic year around, or summer and winter, operation of the heating system, together with improved maximum boiler temperature safety control.

The main objects of this invention are to provide an improved operating control circuit for hot water heating systems wherein the boiler water temperature is automatically maintained at a substantially constant degree the year around for domestic water heating purposes as well as the usual winter heating of the premises; to provide such a control circuit having safety provisions for cutting out the heat generating portion of the system and operating means for dissipating heat from the boiler when the same is heated beyond a predetermined safe maximum temperature; to provide such a circuit which prevents circulation of boiler water to the premises heating devices when the boiler water temperature falls below a predetermined minimum; to provide an improved unitary control device for effecting complete winter and summer control of a hot water heating system, as well as forced dissipation of heat from an overheated boiler; and to provide such a control device that is actuated by a single thermostatic element.

A specific embodiment of this invention is shown in the accompanying drawing in which:

Figure 1 is a view of the control device switching elements showing their relative positions when actuated by excessively high boiler water temperature to operate a heat dissipating means.

Fig. 2 is a view of the same showing the switching elements in their normal operating positions.

Fig. 3 is a view of the same showing the relative positions of the switching elements when actuated by below normal boiler water temperature to operate a heat generating means and prevent circulation of boiler water to premises heating interchangers.

Fig. 4 is a perspective view of the control device switching elements showing the operative arrangement and construction.

Fig. 5 is a sectional view of the control device in elevation showing the thermostatic actuating means.

Fig. 6 is a diagrammatic view showing the electrical connections and circuits for complete control of a hot water heating system during both summer and winter operation, and Fig. 7 is a diagrammatic view showing a modified arrangement of electrical connections and switching elements for complete summer and winter control of a hot water heating system.

My improved control device comprises mainly a plurality of switching elements, one or more of which is arranged to be thermostatically actuated and to be connected through suitable linkage or toggle mechanism with other switching means whereby actuation of the latter is effected and controlled by movement of the former during its movement under thermostatic influence, all arranged whereby several switching operations are automatically performed and controlled by a single thermostatic element.

In the form shown in the drawing my improved device comprises a plurality of switching elements of the mercury tube type, two of which are directly actuated by a thermostatic element and one of which is actuated by linkage through movement of the first two elements. The first two switching elements comprising the mercury tubes 1 and 2 are mounted on a single arm or carrier 3, which in turn is fixedly mounted transversely and at the end of an actuating rod 4, the rod 4 being preferably connected to the arm or carrier 3 at a point centrally between the tubes 1 and 2.

The rod 4 may be arranged to be actuated rotatably by any suitable thermostatic mechanism. However, in the form shown the rod 4 is rotated by a thermostatic spring 5 made in the form of a helix surrounding the rod 4 and extending axially thereof, one end of the spring 5 being fixed to the rod 4 as at 6 and the other end being suitably secured to a relatively fixed member 7 mounted on the housing 8 which encloses the device. As shown the member 7 is provided with a bore in which the rod 4 is journaled and the member 7 is shiftably mounted on the inner side of the housing 8. On the outer side of the housing and concentric with the member 7 is a nipple-like portion 9 which may be formed integral with the housing 8 and this nipple portion 9 is threaded internally to receive a cylindrical shell 10 for shielding and housing the thermostatic element 5, and is threaded externally for connection with or in the wall of a boiler or water receptacle into which the housed thermostatic element is intended to extend. The member 7 is provided with a lever 11 by means of which it may be shifted angularly relative to the axis of the rod 4 for adjustment of the temperature range within which the device is desired to act and the arrangement is such that under ordinary circumstances the member 7 may be shifted only by the lever 11.

The third and remaining switching element comprises a mercury tube 12 fixedly mounted on an arm 13 which is pivotally secured to a post 14 provided in the upper portion of the housing 8.

As shown in Figs. 4 and 5, the arm 13 extends downwardly below the tube 12 and is provided with a vertical slot 15 in which a pin or lug 16 engages, the pin or lug 16 being mounted on a vertical extension 17 of the arm 3.

Thus upon angular movement of the arm 3, under the action of the thermostatic element 5, the arm 13 is swung in an angularly opposite direction, the pin or lug 16 riding in the slot 15 and causing the arm 13 to swing.

As shown in Fig. 4 each of the mercury tubes or switching elements contains a quantity of mercury and one or more pairs of contacts each contact being the terminal of an electrical connection. The pairs of contacts are disposed adjacent the ends of the mercury tubes and, upon tilting of the tubes so that the side thereof in which the contacts are mounted is lowered, the mercury flows under the action of gravity and engages the contacts completing an electric circuit between them.

In the form shown the tube 12 is provided with two pairs of contacts, one pair being disposed adjacent each end of the tube and the contacts of each pair being relatively close together. The tube 1 is provided with one pair of contacts, one of which is disposed adjacent the end of the tube and the other of which is disposed substantially midway between the end and the center of the tube, and tube 2 is provided with one pair of contacts positioned relatively close together and disposed at the end of the tube 2 on the side of the arm 3 opposite the side on which the contacts of the tube 1 are located. Thus upon tilting of the tubes 1 and 2 under the action of the thermostatic element 5, the tube 12 is likewise tilted but in the opposite direction, and the mercury contained in each tube is caused to make or break connections between the contacts of the several pairs of contact elements as indicated in Figs. 1 to 3 inclusive and as will be hereafter described.

My improved control circuit for year-around operation and safety control of a hot water heating system is shown diagrammatically in Fig. 6 of the drawing, wherein the complete control circuit, including a room thermostat and the devices under control, are indicated.

While a boiler and radiators or heat interchangers are not shown in the drawing herein, it will be understood that the thermostatic switching device is intended to be installed in a wall of the boiler so that the thermostatic element is immersed in the boiler water and that the room thermostat is intended to be positioned so that it will be affected by the radiators or heat interchangers which are intended to heat the premises during cold weather operation of the heating system.

As shown in Fig. 6 the devices under control comprise a circulator or pump motor 18 and an oil burner motor 19. However, it will be understood that any of several electrically actuated devices for controlling the operation of the heat generating portion of the heating system, such as a gas valve, oil valve, stoker motor or damper regulating mechanism, may be substituted for the oil burner motor shown.

Referring to Figure 6, current for the operation of the circulator motor and the oil burner motor is supplied through the power lines 20 and 21 which ordinarily are supplied with current at 110 volt pressure.

The line 20 is connected directly to the inner contacts of the two pairs of contacts comprising the double-throw mercury switch 12 by leads 22 and 23, the lead 23 serving the contact on the right-hand or "hot" side of the tube 12, and the lead 22 serving the contacts on the left-hand or "cool" side of the tube 12.

The outer or second contact of the pair on the "hot" side of the tube 12 is connected by a lead 24 directly with one terminal of the circulator motor 18. The other terminal of the circulator motor is connected directly to the power line 21.

The outer or second contact on the "cool" side of the tube 12 is connected by a lead 25 into a lead 26 extending from the room thermostat 27. The lead 26 connects one side of the room thermostat 27 with one of the contacts in the mercury tube 2, and the other contact of the mercury tube 2 is connected to the opposite side of the room thermostat by a lead 28. The lead 28 is also connected to one terminal of the oil burner motor 19 by means of a branch lead 29 and the opposite terminal of the oil burner motor 19 is connected directly to the power line 21 by means of the lead 30. The two contacts of the mercury tube 1 are connected respectively by leads 31 and 32 to the first-mentioned terminals of the oil burner motor and the pump motor to which the leads 29 and 24 are respectively connected.

In operation of the hereindescribed control device and control circuit the tube 12 is mounted on the arm 13 in such manner that under normal operating conditions it would be tilted to the "cool" side, or the left in the drawing, and be substantially parallel to the tubes 1 and 2 which are likewise tilted to the left, as indicated in Fig. 2 of the drawing.

Under these conditions, the mercury carried within the tubes 1 and 12 will close a circuit between the contact terminals of lines 22 and 25, and 31 and 32 respectively, and the controlled devices will be directly under the control of the room thermostat 27. Thus, if the room thermostat should call for heat and close a connection between the leads 26 and 28, the circulator motor and the oil burner motor will be simultaneously started, current flowing from the line 20 through the lead 22 into the switch or mercury tube 12 from which it passes through the lead 25 to the lead 26 of the thermostat 27 through the thermostat 27 and the leads 28 and 29 to one terminal of the burner motor 19, at which point the current is divided, part passing through the burner motor 19 and the lead 30 back to the other side of the line 21 and part of the current passing through the lead 31, the contacts of the tube 1 and the lead 32 to one side of the circulator motor 18, and through the motor 18 to the power line 21. Thus the two motors 18 and 19 are connected electrically in parallel and will continue to operate under normal conditions until the room thermostat 27 is satisfied, at which point the thermostat 27 breaks the circuit between the lines 26 and 28 and causes the motors 18 and 19 to stop.

In the event that during operation of the burner motor heat will be introduced into the heating system faster than it is dissipated by means of the heat interchangers which serve to heat the premises and the boiler water temperature reaches a predetermined maximum safe degree, the control device switching elements will assume a position such as indicated in Fig. 1, wherein the tubes 1 and 2 are tilted far to the left or their "hot" side under action of the thermostatic element 5. Through the action of the linkage or connections 13 and 17, the tube 12 will, under this condition, be caused to be tilted to the right, or its "hot" side, so that the mercury therein will complete a connection between the contact terminals of the lines 23 and 24, closing a circuit to the pump or circulator motor 18. Also, the mercury in the tube 1 will pass further toward the end of the tube 1 and away from the contact terminal of the line 32, breaking the circuit between the lines 31 and 32.

Under such condition, regardless of whether or not the room thermostat 27 is calling for heat, current can flow only to the circulator motor 18, the current passing from the line 20 through the leads 23 and 24 to the circulator motor 18, and thence through the motor to the line 21. The connection between the lines 31 and 32 in the tube 1 being broken, no current can flow from the line 24 to the oil burner motor 19, by way of the lines 32 and 31. Thus the circulator motor 18 will be caused to operate exclusively and circulate the overheated boiler water through the premises heating interchangers until sufficient heat has been dissipated to cool the boiler water temperature down to a point where the switching elements of the control device, under the action of the thermostatic element 5, assume their normal position as shown in Fig. 2 of the drawing. At this point the entire system will be shut down if the room thermostat 27 is satisfied. Otherwise the oil burner would be started because of connection between the lines 26 and 28 in the room thermostat 27 and will continue to run until the thermostat 27 is satisfied.

The above-described operation of the circulator motor 18 under a condition where the boiler water has reached a predetermined maximum safe temperature will be effective as a safety measure in either winter or summer operation of the heating plant, since it is sometimes possible through accident or otherwise for the oil burner motor to be caused to operate continuously; for example, as by a short between the leads 26 and 28, and under such a condition the operation of the circulator motor in sending hot boiler water to the premises heating interchangers would be immediately noticeable in many locations remote from the heating system, particularly in the summer time, and would give warning that the heating plant should be investigated to determine what is causing the faulty operation.

In summer operation of the heating system, in order to maintain a reservoir of hot water in the boiler for purposes of heating water for domestic use, through an auxiliary water heater, the tube 2 is utilized to start the burner motor when the boiler water temperature has dropped below a predetermined minimum point. Under such condition the thermostatic element 5 will cause the tubes 1 and 2 to tilt far to the right or their "cold" side, as shown in Fig. 3, so that the mercury held in the tube 2 will complete a circuit between the contact terminals of the leads 26 and 28, which shunts the room thermostat 27 so that current will then flow from the line 20 through the lead 22 to the lead 25 by way of tube 12, and thence through the leads 26, 28 and 29 to the burner motor 19, and thence by way of lead 30 to the power line 21.

The mercury tube 1, being carried parallel with the tube 2, breaks the circuit between the contact terminals of the lines 31 and 32, so that when the boiler water temperature is below a predetermined minimum degree, it will be impossible for the circulator motor to operate the remaining circuit to the circulator motor 18 by way of the contact terminals of leads 23 and 24 in tube 12 being likewise broken, due to the fact that the tube 12 is tilted far to the left, or "cool" side, through the linkage 17 and 13.

This feature of the control device serves the additional purpose of obviating the operation of the circulator motor 18 when the boiler water temperature is below the predetermined minimum, regardless of whether or not the room thermostat 27 is calling for heat, which is of material advantage in winter operation where in severely cold weather heat is dissipated from the premises heating interchangers faster than it can be generated by the combustion device, as for example, upon turning up the room thermostat in the morning after having let the premises cool off during the night. Under such conditons if heat were dissipated from the system faster than it can be introduced by the combustion device, the control device will positively prevent the circulation of cold or cool water from the boiler to the interchangers until the boiler water temperature has had sufficient time to build up to such a point that a serviceable reservoir of heat will be provided.

A modification of my improved control device and control circuit is shown in Fig. 7, wherein only two mercury tubes or switching elements are employed.

As shown in Fig. 7 the tube 33 either closes a circuit permitting operation of the oil burner motor, or closes another circuit preventing operation of the oil burner motor and permitting operation of the circulator motor, and the tube 34 serves the dual purpose of either preventing operation of the circulator motor when the boiler water temperature is below a predetermined minimum degree and starting the oil burner motor or permitting operation of the circulator motor exclusively when the boiler water temperature has reached a safe maximum degree. The circuit connections are such that power is brought in by the lines 35 and 36, the line 35 passing directly through the room thermostat 37, and the line 36 being connected directly to one terminal of the circulator motor 38 and to one terminal of the oil burner motor 39 by way of leads 40 and 41 which are interrupted by the pair of contacts 42 in the mercury tube 33. From the thermostat 37 a lead 43 is connected to the other terminal of the oil burner motor 39 by way of a branch lead 44 and to the other terminal of the circulator motor 38 by way of leads 45 and 46 which are interrupted by the contact terminals 47 of the tube 34. The contact terminals 48 of the tube 33 by way of leads 49 and 50 serve to short-circuit, or shunt, the thermostat 37 in the event that the boiler water temperature reaches a predetermined maximum safe degree in order to cause operation of the circulator motor 38, operation of the oil burner motor 39 under such condition being prevented by the fact that the circuit will be open between the contact terminals 42. The contact terminals 51 of the tube 34 serve to short-circuit, or shunt, the thermostat in the event that the boiler water temperature drops below a predetermined minimum degree and cause operation of the oil burner motor 39 excessively, the circuit through the circulator motor 38 being open at the contact terminals 47.

Under normal operation of the circuit shown in Fig. 7, the circuit between the contact terminals 42 and 47 will be closed. The circuit between the terminals 42 will be interrupted when the boiler water reaches its maximum high temperature, the tube 34 being tilted far to the left, thereby tilting the tube 33 to the right; and the circuit between the contact terminals 47 will be broken when the boiler water temperature drops below a predetermined minimum degree wherein the tube 34 is turned to the right or "cold" side.

The main advantages of my improved control device lie in the unitary construction thereof in which a plurality of independent switching operations are controlled entirely by a single thermostatic actuating element and also in the arrangement wherein the several switching operations must all be positively performed upon the performance of any one of them.

Another advantage of my improved control circuit lies in the combination with the ordinary control circuit of the feature wherein the circulating pump motor is caused to operate exclusively and independently of the room thermostat whenever the boiler water temperature reaches or passes beyond a predetermined safe maximum degree.

The advantage of the circuit shown in Fig. 6 is mainly in the fact that one side of the power line is brought through one of the switching elements of the control device before passing to any of the devices under control which facilitates installation and obviates the necessity of bringing live wires to the floor where they are apt to be short-circuited by dampness or flooding of the basement in which the heating plan is usually installed.

In Fig. 7 of the drawing a control device employing only two mercury switching elements is indicated and it will be understood that the control device shown in Figs. 1 to 6 inclusive may be likewise constructed with only two mercury switches, the switches 1 and 2 of Fig. 6 being combined in one tube substantially as indicated by the tube 34 in Fig. 7.

Although but one specific embodiment of this invention is herein shown and described, it is to be understood that numerous details may be altered or omitted without departing from the spirit of the invention as defined by the following claims:

I claim:

1. An electric control for hot water heating systems comprising a combustion device and a circulator connected electrically in parallel with a source of power, a room thermostat connected to control operation of said combustion device and circulator, a shiftable switch arranged to be actuated by thermostatic means responsive to boiler water temperatures, said switch being arranged to interrupt and normally close the circuit to said circulator and to be shiftable on a predetermined drop in boiler water temperature to open said circulator circuit and close a circuit shunting said room thermostat, and a second switch arranged to be actuated by movement of the first switch in response to a predetermined maximum boiler water temperature to open the circuit to said combustion device and close a circuit to said circulator independently of the said room thermostat.

2. An electric control for hot water heating systems comprising a combustion device and a circulator electrically connected in parallel with a source of power, a room thermostat connected to control operation of said combustion device and said circulator, a switching means arranged to interrupt and normally close the circuit to said circulator and to be shiftable to open the circuit to said circulator and close a circuit shunting said room thermostat, a second switching means arranged to interrupt and normally close the circuit to said combustion device and to be shiftable to open the circuit to said combustion device and close a circuit to said circulator independently of said room thermostat, thermostatic means arranged to be responsive to boiler water temperature changes and to shiftably actuate one of said switching means, and means mechanically connecting said switching means whereby shifting of one will cause shifting of the other, said connecting means and said switching means being arranged so that the first-named switching means will be shifted to close the circuit shunting said room thermostat on a predetermined drop in boiler water temperature while said second switching means maintains the said normally closed circuit to said combustion device and so that said second switching means will be shifted to close a circuit to said circulator only at a predetermined maximum boiler water temperature.

3. An electric control for hot water heating systems comprising a double-throw mercury switch having a pair of contacts at each end thereof, said switch being mounted on a pivoted arm, a source of electric power and connections between one side thereof and one of each pair of said contacts, the others of said contacts being respectively connected to the first terminal of a room thermostat and the first terminal of a circulator, a lead connecting the second terminal of said room thermostat with the first terminal of a combustion device, leads connecting the second terminals of said combustion device and said circulator to the other side of said power source, other mercury switch means having a pair of contacts at one side connected respectively with the first and second terminals of said room thermostat, and a pair of relatively widely spaced contacts adjacent the other side connected respectively to the first terminals of said circulator and combustion device, said other switch means being mounted on a pivoted arm, thermostatic means arranged to be responsive to boiler water temperature changes and to pivotally shift one of said arms and tilt the mercury switch means mounted thereon, and means connecting said arms whereby pivotal shifting of one will cause opposed pivotal shifting of the other, the contacts of the first-named switch connected between said source of power and said circulator being disposed on the same side of said switch relatively as the contacts of the other switch means which are connected to the said room thermostat, said switch and other switch means being arranged so that both pairs of contacts of said other switch means will be open when the first named switch is in position closing the contacts thereof connected with said circulator.

4. An electric control for hot water heating systems comprising a combustion device and a circulator connected electrically in parallel with a source of power, a room thermostat arranged and connected to start and stop operation of said combustion device and circulator simultaneously, and a shiftable switch arranged to be actuated by thermostatic means responsive to boiler water temperatures and to stop and start said circulator independently of said combustion device when said combustion device is operating, said switch also being arranged to stop and start said fuel burner alone independently of said thermostat.

FREDERICK C. BRODERICK.